United States Patent [19]

Passarell et al.

[11] Patent Number: 4,504,036
[45] Date of Patent: Mar. 12, 1985

[54] ENGINE MOUNT PRELOADED IN SHEAR

[75] Inventors: Wayne H. Passarell, Milford; Jeffry A. Ziegler, Woodhaven, both of Mich.

[73] Assignee: Ford Motor Company, Dearborn, Mich.

[21] Appl. No.: 429,368

[22] Filed: Sep. 30, 1982

Related U.S. Application Data

[63] Continuation of Ser. No. 159,997, Jun. 16, 1980, abandoned.

[51] Int. Cl.³ .................................................. F16M 13/00
[52] U.S. Cl. .................................................... 248/632
[58] Field of Search ............. 248/603, 604, 621, 632; 267/140.3, 141.2; 403/221, 224, 225

[56] References Cited

U.S. PATENT DOCUMENTS

| 2,076,034 | 4/1937 | Lampman | 248/605 |
|---|---|---|---|
| 2,257,804 | 10/1941 | Lord | 267/141 |
| 2,329,829 | 9/1943 | Clayton | 248/605 |
| 2,925,973 | 2/1960 | Aebersold | 248/569 |
| 3,035,799 | 5/1962 | Peirce | 267/140.3 |
| 3,132,830 | 5/1964 | Adloff | 248/605 |
| 3,326,501 | 6/1967 | Cauvin | 248/605 |

FOREIGN PATENT DOCUMENTS

| 38923 | 8/1972 | Japan | 403/225 |
|---|---|---|---|
| 890032 | 2/1962 | United Kingdom | 248/632 |

Primary Examiner—William H. Schultz
Attorney, Agent, or Firm—Peter D. McDermott; Roger L. May

[57] ABSTRACT

An engine mount (10) having two irregular hexagonal housings (12 and 14) with a central lug (16) passing therethrough bonded to two series of four pads (18–21 and 21–25) to each housing in which the housings are laterally offset from each other such that when they are mounted onto a chassis (32), the one housing (12) becomes aligned with the second housing (14) to preload the pads bonding it to the lug (16) while the elastomeric pads (21–25) bonding the lug (16) to the second housing (14) remain substantially unloaded.

8 Claims, 11 Drawing Figures

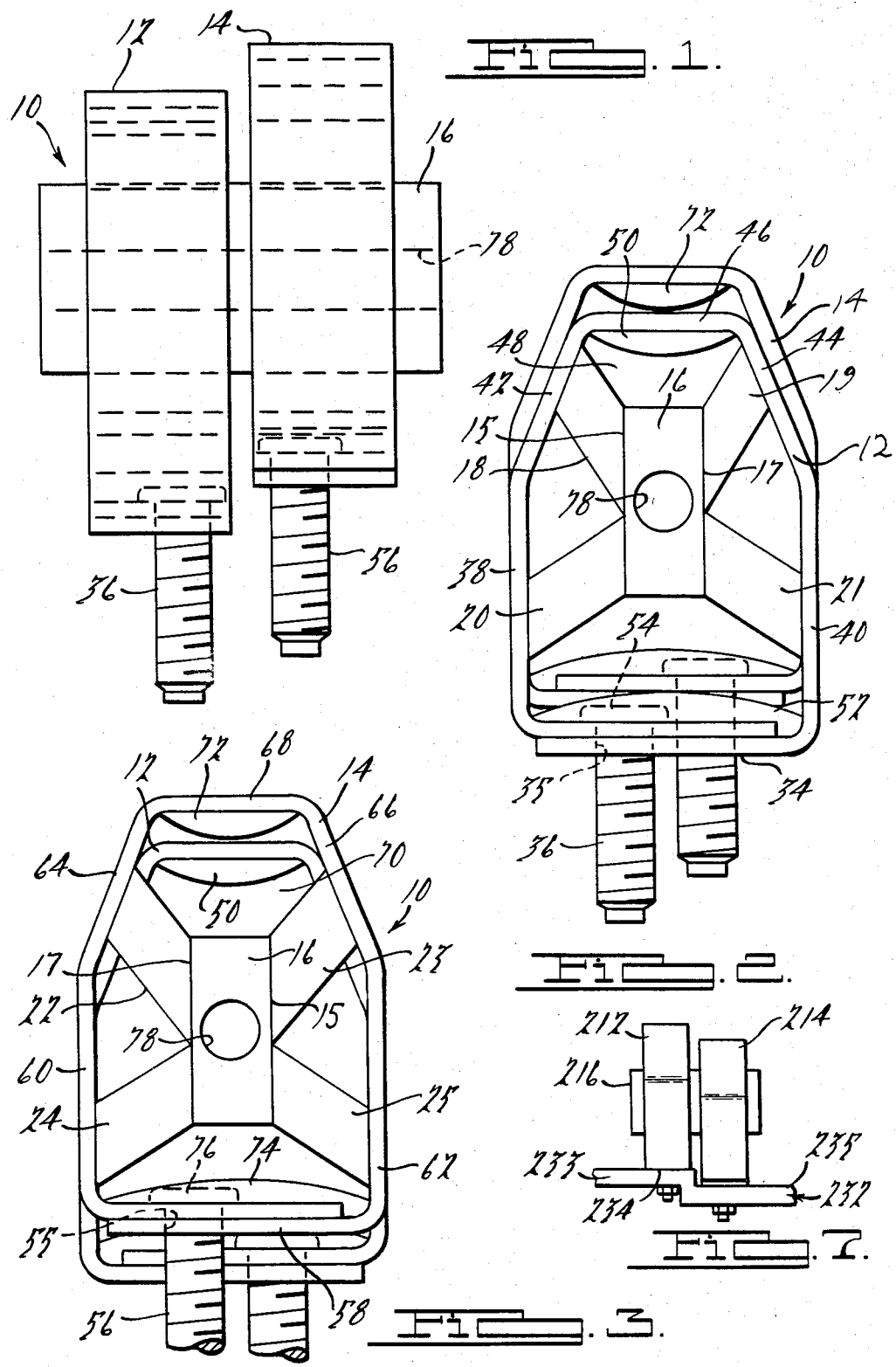

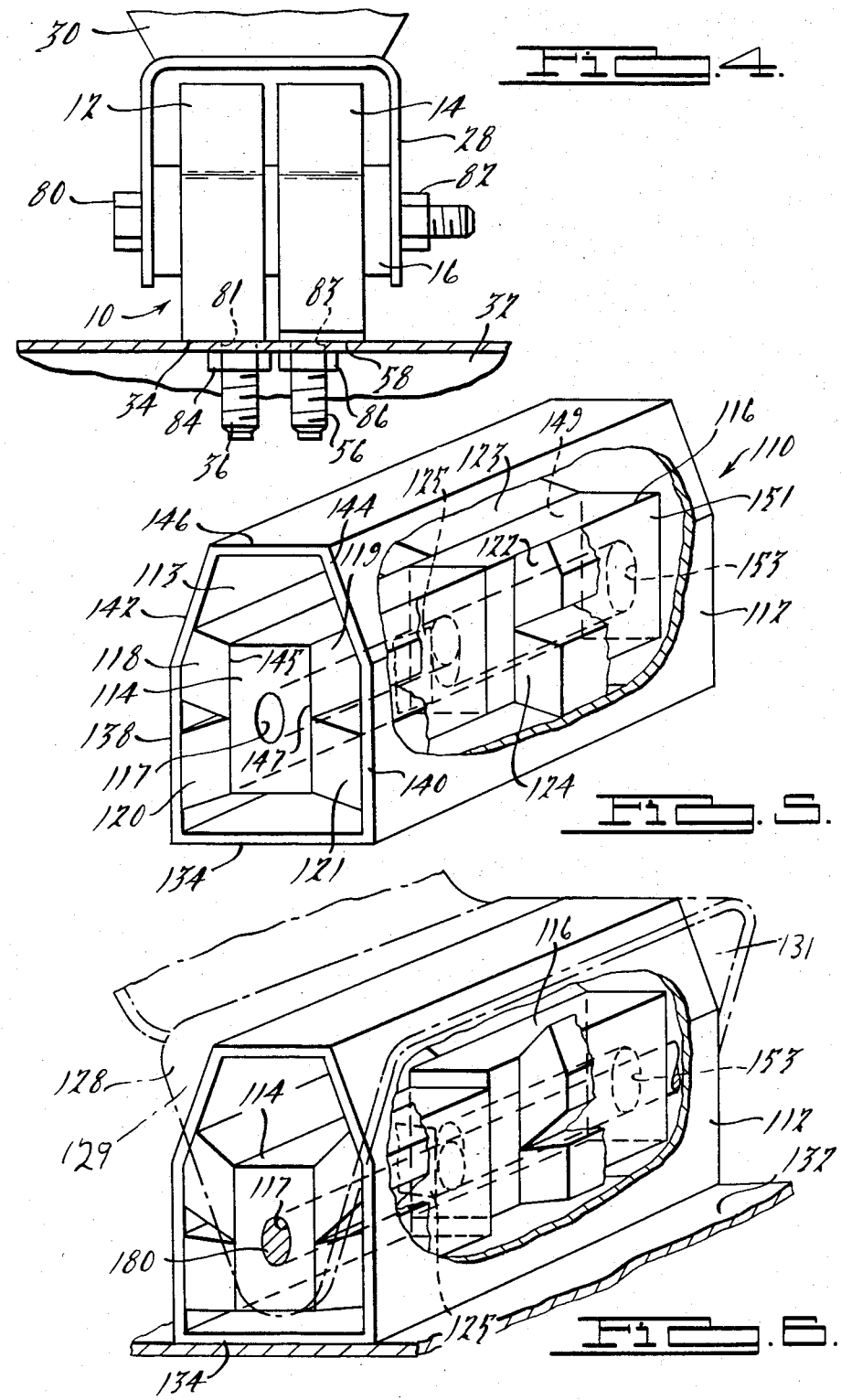

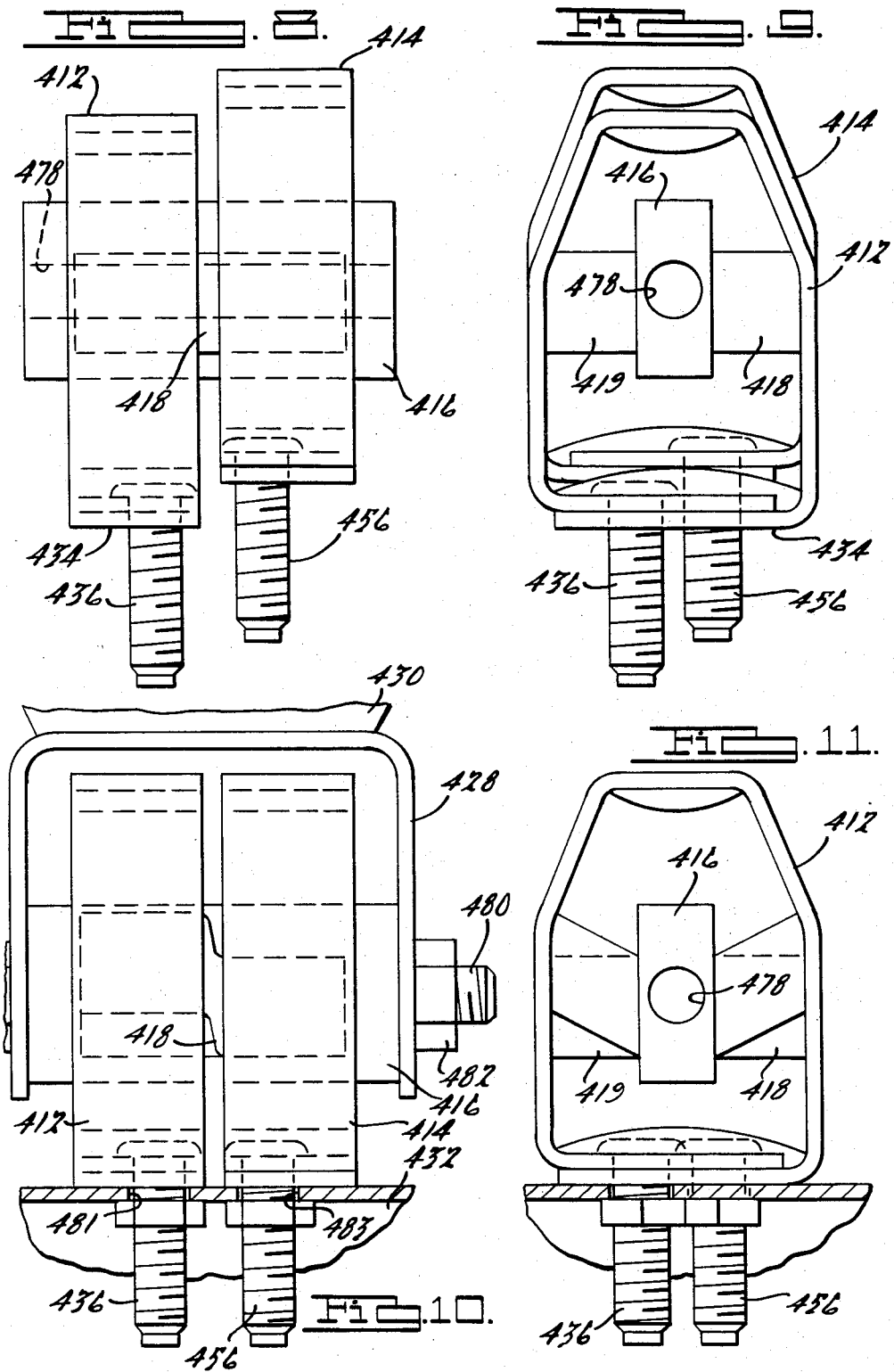

ENGINE MOUNT PRELOADED IN SHEAR

This is a continuation of application Ser. No. 159,997, filed June 16, 1980, abandoned.

TECHNICAL FIELD

This invention relates to vibration isolating mounts and, more particularly, to engine mounts.

BACKGROUND DISCLOSURE INFORMATION

Elastomeric engine mounts have long been incorporated in motor vehicles to isolate engine vibrations from the chassis and vehicle body. The isolation of vibration provides a more comfortable ride. In its most common and basic form, an engine mount has one horizontal plate secured to the frame of the motor vehicle with a block of rubber interposed between the two plates and bonded thereto. The rubber undergoes compression during vibrations of the engine.

Further developments have a plurality of separate rubber pads stacked in an assembly to isolate vibrations. One such construction is disclosed in U.S. Pat. No. 2,076,034 issued to Lampman on Apr. 6, 1937.

It is also known to use vibration isolating mounts where the rubber acts in shear by attaching one vertical plate to the supporting member and the second spaced vertical plate to the supporting member with the rubber interposed therebetween and bonded to the two vertical plates. One such construction is disclosed in U.S. Pat. No. 2,257,804 issued to Lord on Oct. 7, 1941. It is known that rubber acting in shear has a lower resilient rate than rubber acting in compression. Hence, shear mounts have the advantage of obtaining a lower resilient rate than comparable compression mounts.

It is also known to change the characteristics of the rubber by introducing cavities within the rubber which changes the vibration characteristics. The cavities effectively lower the resilient rate of the mount. One such construction is disclosed in U.S. Pat. No. 3,132,830 issued to Adloff on May 12, 1964.

Furthermore, it is disclosed in U.S. Pat. No. 2,925,973 issued to Aebersold on Feb. 23, 1960 to use tubular housings mounted to one of the engine or chassis with an elastomeric sleeve fitted therein having an eccentrically place aperture therethrough. A bolt extends therethrough to the aperture and is fixed to the other of the engine or chassis. The thick portion of the elastomeric sleeve is loaded and the thin portion is unloaded in compression.

U.S. Pat. No. 3,035,799 issued to Pierce discloses another compression mount where one elastomeric pad is compressed more than a second elastomeric pad.

British Pat. No. 890032 to Hirst discloses a resilient mount having two annular rings of elastomer. The outer ring is loaded in shear and the inner ring is unloaded in shear until an excess load is applied to the mount. However, this mount is deficient for use with motor vehicles because the mount does not use the elastomeric ring in damping vibrations in the upward direction. The mount has its inner sleeve merely lift off the frame and all the upward vibration is absorbed by the preloaded elastomeric ring.

It is desired to improve vibration isolation of an engine with respect to the chassis by use of a mount which is constructed such that some elastomeric material is preloaded in shear while other elastomeric material is effectively unloaded when the engine is statically mounted onto the chassis. It is also desired to have a mount where all the elastomeric material undergoes shear for both upwardly and downwardly directed vibrations.

SUMMARY OF THE INVENTION

In accordance with the invention, an engine mount has two housings having central openings therethrough with a common bracket extending through the openings. The elastomeric pads are bonded to the bracket and each of the housings such that when the mount is in the unmounted position, one housing is laterally offset from the other housing and both sets of pads are unloaded in shear. The housings are mounted to one of the engine or the chassis. The bracket extending through the openings of the housings is mounted to the other of the engine or the chassis such that the two housings are aligned with each other, the elastomeric pads of one housing are preloaded in shear, and the pads of the other housing remain unloaded in shear or relatively unloaded.

More broadly, the invention relates to a vibration insulating mount with at least one mounting component being rigidly connected to one of a supporting member or a supported member and a single mounting component being rigidly connected to the other of the supported or supporting member. At least one axially extending elastomeric pad abuts said respective mounting components rigidly connected to said supporting and supported members and constructed such that the at least one pad is preloaded in shear at one axial position unloaded or and preloaded a lesser magnitude at another axial position when the mount is supporting the supported member.

According to one embodiment of the invention, a vibration insulating mount comprises at least one mounting component rigidly connected to a supporting member and at least one other mounting component rigidly connected to the supported member. At least one axially extending elastomeric pad abuts both the aforesaid mounting components. When the vibration insulating mount is in use, that is, when it is mounting the supported member on the supporting member, a first portion of each such elastomeric pad is preloaded in shear and a second portion (such second portion being axially spaced from the first portion) is unloaded or is loaded in shear a lesser magnitude than is the first portion.

BRIEF DESCRIPTION OF THE DRAWINGS

FIG. 1 is a side elevation view of an engine mount according to the present invention.

FIG. 2 is a front elevation view of the engine mount of FIG. 1.

FIG. 3 is a rear elevation view of the engine mount of FIGS. 1 and 2.

FIG. 4 is a side elevation view of the engine mount of FIGS. 1, 2 and 3 shown mounting an engine (partially broken away) to a chssis (also partially broken away).

FIG. 5 is a perspective view, partially broken away, of an engine mount according to a second embodiment of the present invention.

FIG. 6 is a perspective view, partially broken away, of the engine mount of FIG. 5 shown mounting a chassis (partially broken away) to an engine bracket (in phantom and partially broken away).

FIG. 7 is a side elevation view of an engine mount according to a third embodiment of the present invention, shown mounted to a chassis.

FIG. 8 is a side elevation view of a fourth embodiment of the invention.

FIG. 9 is a front elevation view of the engine mount of FIG. 8.

FIG. 10 is a side elevation view of the engine mount of FIG. 8, shown mounting an engine (partially broken away) to a chassis (also partially broken away).

FIG. 11 is a front elevation view of the engine mount of FIG. 10.

Referring to FIGS. 1 through 4, an engine mount 10 has two housings 12 and 14. A central bracket in the form of lug 16 extends through central openings 48 and 70 of the housings. Elastomeric pads 18 through 25 are bonded to the housings 12 and 14 and lug 16. As shown in FIG. 4, lug 16 is secured to a bracket 28 which is fixed to the engine 30. Housings 12 and 14 are secured to the chassis 32 of a motor vehicle.

In more detail, referring to FIG. 2, housing 12 comprises a band of metal such as steel which is shaped in a generally irregular hexagon shape. The band overlaps itself to form bottom section 34. A bolt 36 downwardly extends through the aperture 35 in the bottom section 34. The irregular hexagonal shaped housing 12 has two opposing vertical extending walls 38 and 40 and above them, slightly angled but generally vertically extending and opposing walls 42 and 44. Top wall 46 spans the central opening 48 between the side walls 42 anf 44. Lug 16 extends through the central opening 48. Pads 18 and 19 are bonded to the side walls 15 and 17 of the lug 16 and also the generally vertically extending walls 42 and 44, respectively. Elastomeric pads 20 and 21 likewise are bonded to the side walls 15 and 17 of lug 16 and the vertically extending walls 38 and 40. The bottom side of the top wall 46 has an elastomeric bumper 52 which covers the head 54 of the bolt 36.

Housing 14, as shown in FIG. 3, is similarly constructed from a band of metal shaped into an irregular hexagon with the bolt 56 extending through aperture 55 in the bottom wall 58. The housing 14 has two vertical extending and opposing walls 60 and 62 and two slightly angled but generally vertically extending and opposing walls 64 and 66. Top wall 68 spans the central opening 70 between the walls 64 and 66. Elastomeric pads 22 and 23 are bonded to the side walls 15 and 17 of the lug 16 and bonded to the generally vertically extending walls 64 and 66, respectively. Lower elastomeric pads 24 and 25 are bonded to the side walls 17 and 19 of lug 16 and the vertical extending walls 60 and 62, respectively. A top elastomeric bumper 72 is bonded to the underside of the top wall 68. An elastomeric bumper 74 is bonded to the top side of the bottom side 58 and covers the head 76 of bolts 56.

In comparison with the first housing 12, the substantial difference is that the housing 14 is vertically shifted upward relative to housing 12 such that the elastomeric pads 22 through 25 are bonded to the walls of the housing 14 in a relatively lower position than where the pads 18 through 21 are bonded to the first housing 12.

The pads 18 through 25 themselves are aligned in pairs such that pads 19 and 22 are aligned, pads 18 and 23 are aligned, pads 24 and 21 are aligned, and pads 25 and 20 are aligned when the mount is in its unmounted position and no preload is exerted on the housings 12 and 14. Each pad 18 through 25 and bumpers 50, 52, 72, 74 are made from a suitable elastomeric material such as natural rubber with a durometer reading ranging from 35 to 60. A durometer reading of approximately 42 has been found to be quite suitable.

Referring now to FIGS. 1 and 4, the lug 16 has a central hole 78 longitudinally extending therethrough. The lug 16 receives a bolt 80 which secures the lug 16 rigidly to the bracket 28. Nut 82 is threaded onto the bolt 80. The bolts 36 and 56 are then positioned in apertures 81 and 83 in the chassis 32 and engine 30 is then lowered into position. The first housing 12 has its bottom wall 34 abut the chassis first due to its relatively lower position. Further lowering of the engine 30 causes the weight of the engine to force the lug 16 to be lowered with respect to the housing 12 and exert a preload in shear on the elastomeric pads 18 through 21. Simultaneously, the housing 14 is lowered with the lug 16 until its bottom surface 58 abuts the chassis surface 32. The elastomeric pads are tuned such that when the bottom wall 58 abuts the chassis 32, the pads 18, 19, 20 and 21 support the engine 30 such that no static shear loads are exerted on the pads 22 23, 24 and 25. Only pads 18 through 21 are preloaded in shear under static conditions. The bolts 36 and 56 are then secured to the chassis by nuts 84 and 86 thereby fixing both housing 12 and 14 to the chassis 32.

Engine vibration is absorbed by the engine mount 10. Downward motion of the engine 30 below the static load position caused by engine vibration is resisted by pads 18 through 25. Pads 18 through 25 undergo shear. Pads 18 through 21 undergo further shear beyond the shear preload in the static conditon and pads 22 through 25 enter shear from their unloaded static conditions. Extreme downward motion is also resisted by bumpers 52 and 74.

Upward motion is resisted by pads 22 through 25 entering shear. Pads 18 through 21 are unloaded from the preload during slight upward motion of the engine. Moderate upward motion is resisted by pads 18 through 21 entering shear after being unloaded as well as pads 22 through 25 undergoing further shear. Extreme upward motion is also resisted by bumpers 50 and 72.

Referring to FIGS. 5 and 6, a second embodiment according to the invention is disclosed. An engine mount 110 has a tubular housing 112 with a central opening 113 defined therein. The opening 113 receives two lugs 114 and 116. Each lug 114 and 116 is bonded to a set of elastomeric pads 118 through 121 and 122 through 125, respectively, which, in turn, are bonded to the tubular housing 112. As shown in FIG. 6, the lugs are secured to a bracket 128 which is secured to the engine (not shown). The housing 112 in turn is secured to chassis 132.

In more detail, the tubular housing 112 has a generally irregular hexagon cross section formed by the bottom wall 134 and two opposing vertically extending walls 138 and 140 and two angled but generally vertically extending walls 142 and 44 and a top wall 146.

The lug 114 has side 145 opposing walls 138 and 142 of housing 112, and side 147 opposing walls 140 and 144. Lug 116 has side 149 opposing the walls 138 and 142, and side 151 opposing walls 138 and 142. The lug 114 has aperture 117 longitudinally extending therethrough. The lug 116 has oval shaped aperture 153 extending therethrough. Aperture 117 is aligned with the top section of aperture 153 when the engine mount is unloaded as shown in FIG. 5.

Bolt 180 fits through flanges 129 and 131 of bracket 128 and apertures 117 and 153. The weight of the engine is loaded onto the mount before bolt 180 is tightened. As the mount is loaded, the lug 114 moves downward relative to the lug 116 and housing 112 thereby exerting shear loads on pads 118 through 121. As the lug 116 moves downwardly, aperture 117 becomes aligned with the lower portion of aperture 153 as shown in FIG. 6. The bolt 180 meanwhile slides laterally downward in aperture 153. The bolt is then tightened to fix the relative positions of lugs 114 and 116 shown in FIG. 6. In this fashion, pads 118 through 121 are preloaded in shear while pads 122 through 125 are not unloaded in shear or are preloaded in shear a lesser degree than are pads 118–121.

Engine vibration is absorbed by mount 110 in the same fashion as by mount 10. Downward motion of the engine below the static load is resisted by all the pads. Upward motion is resisted initially by pads 122 through 125. Pads 118 through 121 begin to resist the upward motion after they are unloaded from their preloaded position.

A third embodiment is shown in FIG. 7. The structure of the third mount closely resembles the first embodiment shown in FIGS. 1 through 4 in that it has two housings 212 and 214 with a central lug 216 extending through the central openings and rigidly secured to the engine (not shown). The substantial difference is the housings are aligned when in their unmounted state. The chassis section 232 has a raised section 233 which abuts the bottom 234 of housing 212. As the further weight of the engine is loaded onto the housings 212 and 214, the lug 216 preloads the elastomeric pads bonding lug 216 to the housing 212 while the housing 214 is further lowered until it abuts the lowered section of 235 of chassis 232. At this point, the housings 212 and 214 are fastened securely to the chassis such that the pads bonding the lug 216 to the housing 212 are preloaded while the pads bonding the lug 216 to the housing 214 are unloaded or are preloaded to a lesser degree.

It can be seen that the embodiment of FIGS. 8 through 11 closely resembles the embodiment shown in FIGS. 1–4 in that it has two housings 412 and 414 with a central lug 416 extending through the central openings and rigidly secured to the engine 430. The housings are not aligned when in their unmounted state. The lug 416 has a central hole 478 longitudinally extending therethrough. The lug 416 receives a bolt 480 which secures the lug 416 rigidly to the bracket 428. Nut 482 is threaded to the bolt 480. The bolts 436 and 456 are then positioned in apertures 481 and 483 in the chassis 432 and engine 430 then is lowered into position. The bottom wall 434 of the first housing 412 abuts the chassis first due to its relatively lower position. Further lowering of the engine 430 causes the weight of the engine to force the lug 416 to be lowered with respect to the housing 412 and exert a preload in shear on the elastomeric pads 418 and 419 in the region of first housing 412. Simultaneously, the housing 414 is lowered with the lug 416 until its bottom surface 458 abuts the surface of chassis 432. Elastomeric pads 418 and 419 are tuned such that the portion of each pad associated with housing 412 supports the engine 430 while the portions associated with the second housing 414 is substantially unloaded in shear or is preloaded a lesser magnitude than that portion associated with the first housing 412.

It has been found that under a static engine load, better vibration isolation characteristics are presented by a mount constructed with certain pads preloaded in shear while other pads are unloaded in shear or are preloaded to a lesser degree. The mount provides for a rotor vehicle with a substantially improved ride free from engine vibration.

Variations and modifications of the present invention are possible without departing from its spirit and scope as defined by the appended claims.

The embodiments in which an exclusive property or privilege is claimed are defined as follows:

1. A vibration insulating mount comprising:
   first and second mounting components rigidly connected to one of a supporting member or supported member;
   a third mounting component rigidly connected to the other of the supporting member or supported member; and
   elastomeric pads abutting (i) one of said first and second mounting components and (ii) said third mounting component, and elastomeric pads abutting (i) the other of said first and second mounting components and (ii) said third mounting component said elastomeric pads constructed such that said pads abutting said first and third mounting components are no preloade or preloaded in shear and said pads abutting said second and third components are under a preload in shear of lesser magnitude than said pads abutting said first and third components when said mount is supporting said supported member.

2. A vibration insulating mount as defined as in claim 1 wherein said first and second mounting components are aligned and have vertically extending and opposing walls to which said elastomeric pads are bonded thereto; and
   said third mounting components extends between said opposing walls and is bonded to said elastomeric pads.

3. A vibration insulating mount as defined in claim 2 wherein said first and second mounting components comprise two housings having openings therethrough circumscribed by inner walls of said housings;
   said third mounting component comprises a mounting bracket extending through said openings in both housings; and
   said elastomeric pads interposed between said bracket and inner walls of said housing.

4. A vibration insulating mount as defined in claim 1 wherein:
   said third mounting component comprises a housing having vertical extending and opposing walls with a central gap therethrough;
   said first and second mounting components comprise two mounting brackets extending through said gap of said housing; and
   said elastomeric pads interposed between said brackets and walls of said housing.

5. A vibration insulating mount as defined in claim 4 wherein:
   said first bracket has an aperture axially extending therethrough;
   said second bracket has an aperture axially extending therethrough;
   said aperture in said second bracket being laterally elongated in shape relative to said aforementioned aperture in said first bracket;
   said apertures sized to receive a bolt for rigidly connecting said brackets to one of said supported member and supporting member;

said laterally elongated aperture being sized to allow said bolt to laterally slide therein with said bolt abutting said first bracket within said aperture therethrough to move said first bracket and preload said elastomeric pads between said first bracket and housing; and a fastener attachable to said bolt to rigidly lock said first bracket to said second when said elastomeric pads between said housing and first bracket are preloaded in shear.

6. An engine mount for a motor vehicle comprising:

a first and second mounting housing fixed to one of load supporting chassis or an engine of the motor vehicle;

a mounting bracket fixed to the other of the load supporting chassis or the engine of the motor vehicle;

said first and second housings being aligned and having central openings therethrough circumscribed by substantially horizontally and vertically extending inner walls of said housings;

said mounting bracket extending through said openings in both housings;

elastomeric pads being bonded to said mounting bracket and said vertically extending walls of housings; and said elastomeric pads constructed such that said pads bonded to said mounting bracket and said first housing are preloaded in shear and said pads bonded to said mounting bracket and said second housing are under a load of substantially lesser magnitude than said pads bonded to said bracket and first housing when said mount is mounting said engine.

7. A vibration insulating mount comprising:

at least one mounting component being rigidly connected to one of a supporting member and supported member;

a single mounting component being rigidly connected to the other of said supporting member and supported member; and at least one axially extending elastomeric pad abutting said respective mounting components being rigidly connected to said supporting member and said supported member, wherein said at least one pad is preloaded in shear at one axial position and preloaded a lesser magnitude at another axial position when said mount is supporting said supported member.

8. An engine mount for a motor vehicle comprising:

first and second mounting housings, each having a central opening therethrough circumscribed by substantially horizontally and vertically extending inner walls of said respective housings;

a mounting bracket extending through said opening of both housings; and elastomeric pads bonded to said mounting bracket and to said vertical extending walls of said housings;

said first housing being laterally offset from said second housing when said elastomeric pads are unloaded;

wherein the elastomeric pads bonded to said first housing are adapted to become preloaded in shear as said first housing is laterally aligned with said second housing.

* * * * *